United States Patent [19]

Okada et al.

[11] Patent Number: 5,012,593
[45] Date of Patent: May 7, 1991

[54] DEVICE FOR REMOVING WATER DROPLETS

[75] Inventors: Shoji Okada, Toyota; Naofumi Fujie, Nagoya; Koji Ito, Kariya; Tomoaki Imaizumi, Hoi, all of Japan

[73] Assignee: Aisin Seiki Kabushiki Kaisha, Aichi, Japan

[21] Appl. No.: 391,315

[22] Filed: Aug. 9, 1989

[30] Foreign Application Priority Data

Aug. 10, 1988 [JP] Japan .................................. 63-200771
Sep. 30, 1988 [JP] Japan .................................. 63-248369

[51] Int. Cl.$^5$ ............................................. F26B 19/00
[52] U.S. Cl. ............................................. 34/69; 34/14; 15/250 B
[58] Field of Search ................... 34/164, 14, 69, 58, 34/8; 15/250 B

[56] References Cited

U.S. PATENT DOCUMENTS 4,833,373 5/1989 Doi et al. .

FOREIGN PATENT DOCUMENTS 59-8548   1/1984 Japan .
61-30552  2/1986 Japan .
62-238149 10/1987 Japan .
62-191550 12/1987 Japan .

Primary Examiner—Henry A. Bennett
Attorney, Agent, or Firm—Burns, Doane, Swecker & Mathis

[57] ABSTRACT

A device for removing water droplets comprises a plate-like member disposed vibratably, a vibrator bonded to the rear face of the plate-like member and oscillation means for vibrating the vibrator at a predetermined frequency, wherein the thickness and/or the diameter of the vibrator is optimized in relation with the thickness thereof, or the longitudinal, lateral width or thickness of the plate-like member. The water droplets on the plate-like member, e.g., automobile mirror can be removed effectively and uniformly with no worry for the destruction of the vibrator. The oscillation means may, advantageously, be adapted to cause bending vibrations to the vibrator by lateral effect.

12 Claims, 15 Drawing Sheets

12 : Mirror
20 : Ultrasonic vibrator

DEVICE FOR REMOVING WATER DROPLETS

BACKGROUND OF THE INVENTION

1. Field of the Invention

The present invention concerns a device for removing water droplets, ice grains, frosted or condensated moistures, etc. deposited to plate-like members, for example, a reflection mirror of an automobile.

2. Description of the Prior Art

The device of the aforementioned type has been disclosed, for example, in Japanese Utility Model Laid-Open Sho 61-30552 (Date of Laid-open: Feb. 24, 1986) and Japanese Patent Laid-Open Sho 59-8548 (Date of Laid-open: Jan. 17, 1984).

Japanese Utility Model Laid-Open Sho 61-30552 shows a device for removing water droplets deposited on an automobile mirror disposed to the outside of a car body.

As shown in FIG. 21, a back mirror disposed to the outside of a car body comprises a back mirror main body 102 mounted with a mirror 101 made of glass and supported by a stay 103, in which vibrator 104, for example, made of ceramics is disposed between the back mirror main body 102 and the stay 103. The supersonic vibrator 104 is connected with an operation switch 105 disposed inside of a passenger's chamber so that the vibrator can be operated from the inside of the car. Further, a driving circuit 106 and a power source 107 are connected in series between the ultrasonic vibrator 104 and the operation switch 105. The driving circuit 106 is so adapted to amplify a signal generated from an oscillator by an amplifier and send the amplified signal to the ultrasonic vibrator 104 to cause vibration the latter. The device for removing water droplets on the automobile mirror using the conventional ultrasonic vibrator having such a constitution can operate as described below.

If water droplets, etc. are deposited to the surface of a back mirror, the operation switch 105 in a car chamber is operated to vibrate the ultrasonic vibrator 104. The back mirror main body 102 is entirely vibrated by the vibration of the ultrasonic vibrator 104 and the water droplets deposited to the mirror surface can be removed.

However, for uniformly removing the water droplets, etc. deposited on the surface of the mirror 101 by the ultrasonic vibrator 104, it is necessary to vibrate the mirror surface with no unevenness. However, since the ultrasonic vibrator 104 vibrates along the direction of the thickness in the conventional device, it is necessary that the ultrasonic vibrator 104 has substantially the same size as that for the mirror 101, in order to vibrate the mirror surface entirely. As the shape of the ultrasonic vibrator 104 is enlarged, the ultrasonic vibrator 104 tends to cause uneven vibration. Then, if the ultrasonic vibrator 104 is made substantially identical, in the size, with that for the mirror 101, composite resonance is caused between the ultrasonic vibrator 104 and the mirror 101, to generate great stress or heat to the ultrasonic vibrator 104 or the mirror 101 in view of the balance between the size and the thickness of the mirror 101 and that of the ultrasonic vibrator 104, to possibly result in cracking to the ultrasonic vibrator 104 and the mirror 101. In particular, when bending vibrations due to the lateral effect is transmitted to the mirror 101, if the diameter of the ultrasonic vibrator 104 is large, the inner stress in the mirror 101 is extremely increased locally, possibly leading to the destruction of the mirror 101.

SUMMARY OF THE INVENTION

Accordingly, it is a primary object of the present invention to provide a device for removing water droplets using a vibrator having such thickness as reducing the effect of thickness and capable of sufficiently removing water droplets, etc. uniformly on the surface of a plate-like member such as a mirror.

Another object of the present invention is to provide a device for removing water droplets using a vibrator having such a diameter that a plate-like member does not suffer from destruction caused by the increased inner stresses of the plate-like member when the bending vibration due to the lateral effect are transmitted to the plate-like member such as a mirror.

A further object of the present invention is to provide a device for removing water droplets capable of reducing the size of a vibrator as compared with that of a plate-like member and capable of removing water droplets, etc. deposited to the plate-like member with no unevenness.

The foregoing objects of the present invention can be attained, basically, in the first aspect of the present invention by a device for removing water droplets, comprising a plate-like member disposed vibratably, a vibrator bonded to the rear face of the plate-like member and oscillation means for vibrating the vibrator at a predetermined frequency, wherein the thickness of the vibrator is defined as within a range:

$$0.25t \leq T \leq 2.5t$$

where t represents a thickness of the plate-like member and

T represents a plate thickness of the vibrator.

In the first aspect of the present invention, if the thickness of the vibrator is decreased, the effect of the thickness can be reduced thereby enabling to uniformly remove water droplets on the surface of the plate-like member. On the other hand, if the thickness of the vibrator is increased, sufficient power can be obtained even when the vibrator is restrained. Then, if the thickness T of the vibrator relative to the thickness t of the plate-like member is within the range: $0.25t \leq T \leq 2.5t$, the abovementioned two performances can be aligned with the performance of the plate-like member such as an automobile mirror during use.

In a second aspect of the present invention, a device for removing water droplets comprises a plate-like member disposed vibratably, a vibrator bonded to the rear face of the plate-like member and oscillation means causing the vibrator to conduct bending vibration due to lateral effect, wherein the diameter of the vibrator is defined as within at least one of ranges:

$$D \leq L/3 \text{ and } D \leq H/2$$

where

D represents the diameter of the vibrator,

L represents the lateral width of the plate-1 like member and

H represents the longitudinal width of the member.

In the second aspect, when the vibrator transmits radially changing bending vibration to the plate-like member, the inner stress to the plate-like member is locally increased if the diameter of the vibrator is large but this does not bring about destruction to the plate-like member providing that the parameters are defined within the range as specified above.

In a third aspect of the present invention, a device for removing water droplets, comprises a plate-like member disposed vibratably, a vibrator bonded to the rear face of the plate-like member and bending vibration due to lateral effect, wherein the thickness of the vibrator is defined as within a range :

$$0.25t \leq T \leq 2.5t$$

and the diameter for the vibrator is defined as within at least one of ranges:

$$D \leq L/3 \text{ and } D \leq H/2$$

where t, T, D, L and H have the same meanings as described above.

In the third aspect, both of the performances in the first and the second aspects described above can be obtained simultaneously.

In a fourth aspect of the present invention, a device for removing water droplets comprises a plate-like member disposed vibratably, a vibrator bonded to the rear face of the plate-like member and oscillation means causing the vibrator to conduct bending vibration due to lateral effect, wherein assuming the lateral width L of the plate-like member approximately equal to 160, the longitudinal width H thereof approximately equal to 90 and the thickness t thereof approximately equal to 1.9, the thickness of the vibrator is defined as within a range :

$$0.5 \text{ (mm)} \leq T \leq 5 \text{ (mm)}$$

and the diameter D for the vibrator is defined as within a range :

$$20 \text{ (mm)} \leq D \leq 60 \text{ (mm)}.$$

where T and D have the same meanings as described above.

In the fourth aspect, the diameter of the vibrator is defined based on the inner stress and the performance for the bending vibration, due to the general characteristics of a plate-like member such as an automobile mirror.

In a fifth aspect of the present invention, a device for removing water droplets comprises a plate-like member disposed vibratably, a polygonal vibrator bonded to the rear face of the plate-like member and oscillation means the causing vibrator to conduct bending vibration due to the lateral effect at a predetermined frequency, in which the plate-like member is repeatedly bent by the vibrator, thereby removing water droplets deposited to the plate-like member.

In the fifth aspect, the plate-like member is repeatedly bent by the expansion and contraction of the vibrator along the direction of the side of the vibrator having a polygonal shape. This bending causes the plate-like member to vibrate and the excited vibration is transmitted to the entire portion of the plate-like member and, as a result, causes the plate-like member to vibrate entirely. Accordingly, the size of the vibrator can be decreased as compared with that of the plate-like member.

Furthermore, since the vibrator has a polygonal shape, vibration is brought about in different directions on the plate-like member. Since vibration-loops generated on the plate-like member can be displaced by generating the vibration in different directions on the plate-like member, water droplets deposited on the plate-like member can be removed with no unevenness.

The shape of the vibrator may be rectangular in a preferred embodiment.

In a further embodiment of the present invention, the oscillation means may be oscillated at a resonance frequency of the plate-like member.

In a still further embodiment of the present invention, the oscillation means may be oscillated at a frequency out of the range of audible frequency.

BRIEF DESCRIPTION OF THE ACCOMPANYING DRAWINGS

These and other objects, as well as advantageous features of the present invention will become more apparent by reading the following descriptions of preferred embodiments according to the present invention in conjunction with the accompanying drawings, wherein FIG. 1 is a characteristic graph showing a relationship between the thickness of a ultrasonic vibrator and the performance of removing water droplets in a device for removing water droplets for an automobile mirror as a preferred embodiment according to the present invention;

Figure 10:
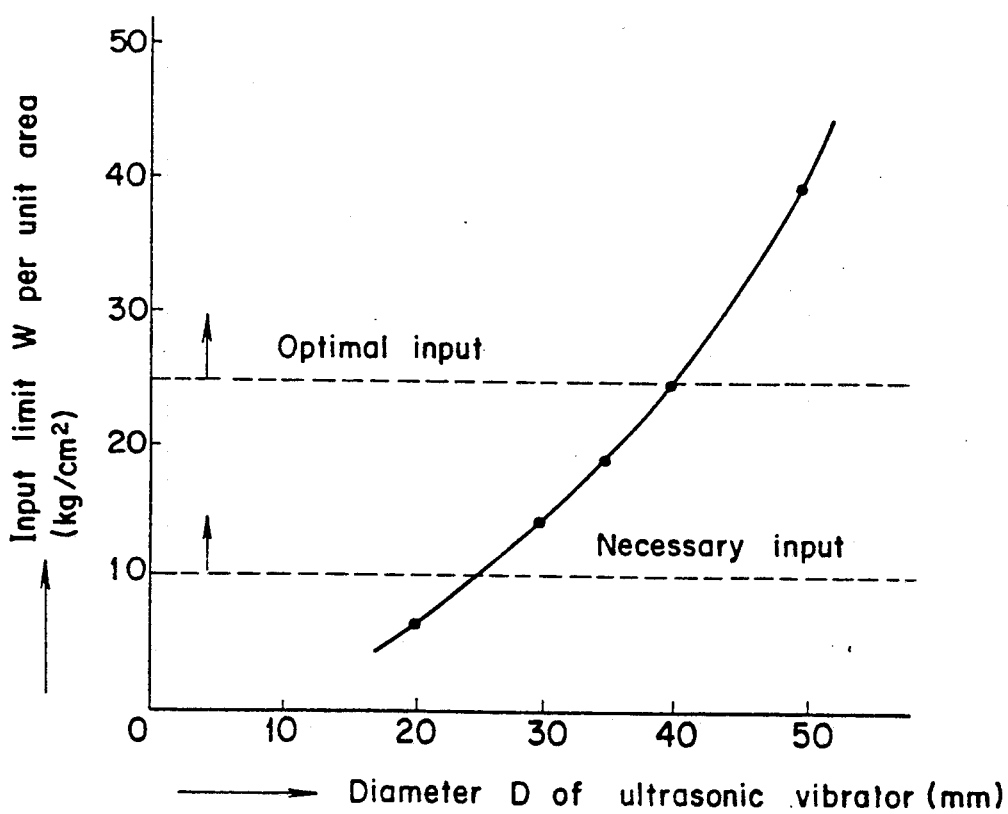
Figure 4A:
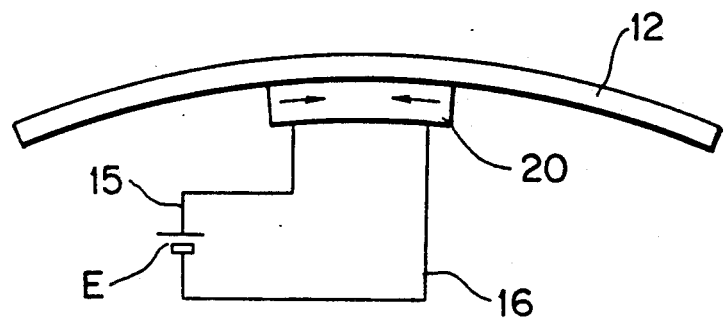
Figure 4B:
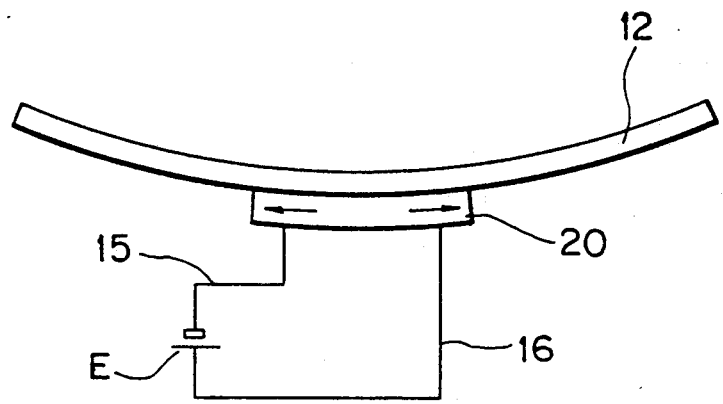
Figure 4C:
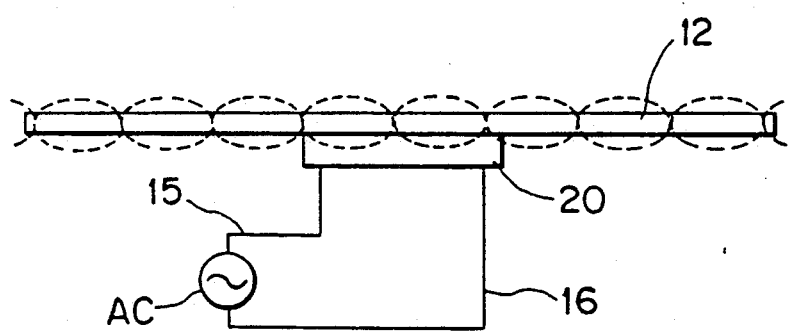
Figure 5:
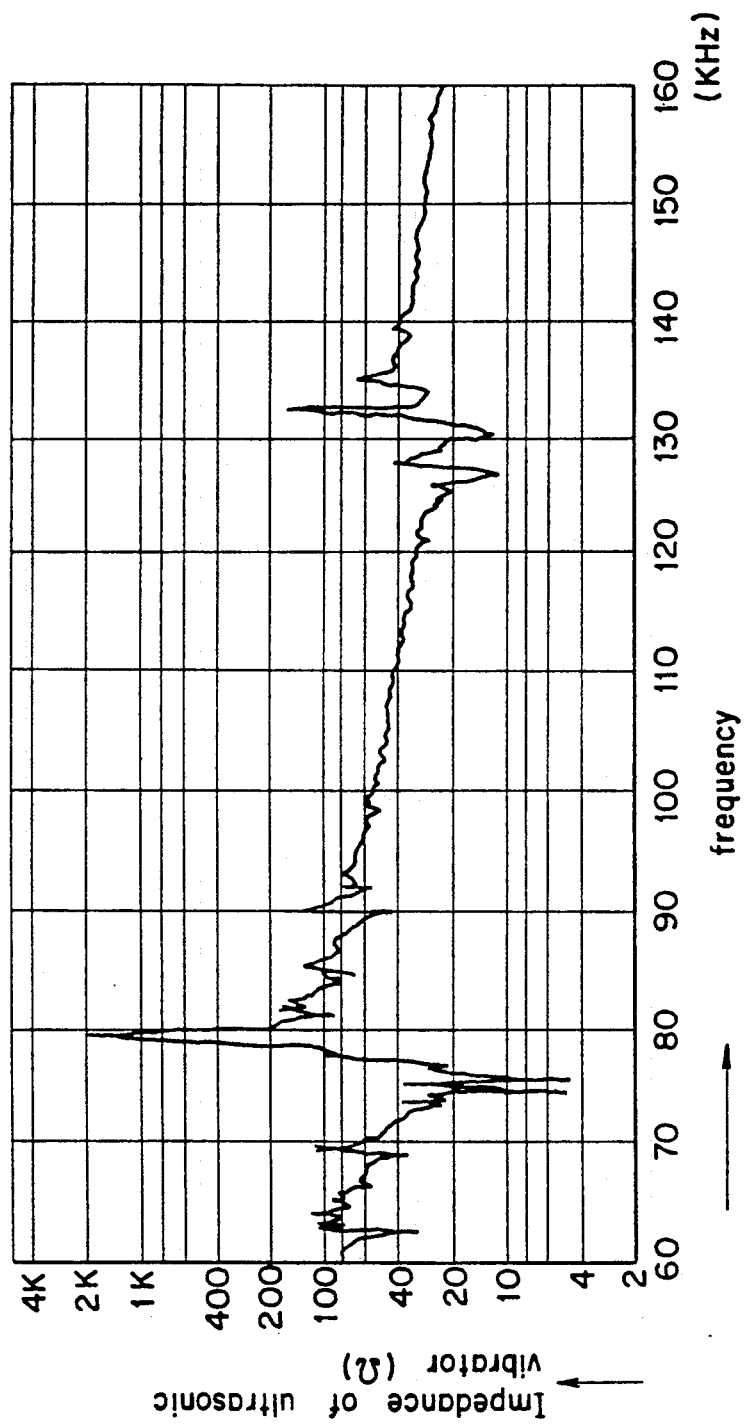
Figure 6A:
Figure 6B:
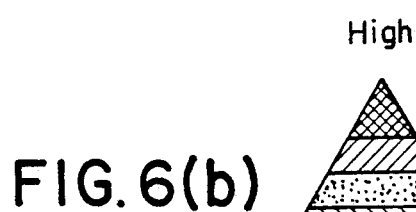
Figure 7:
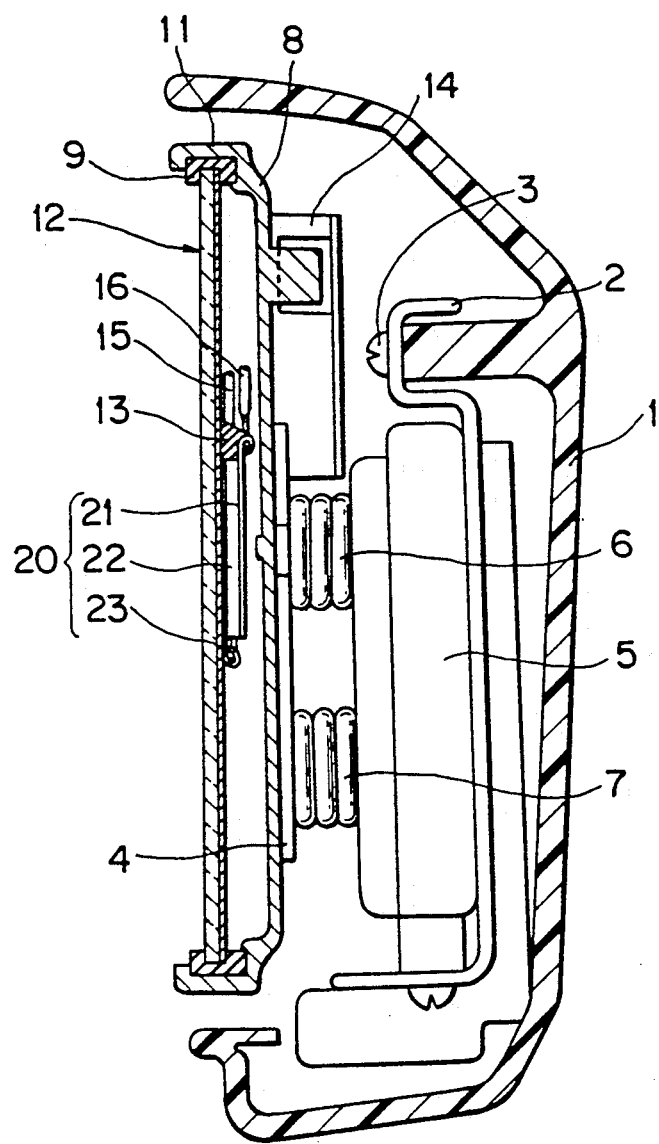
Figure 8:
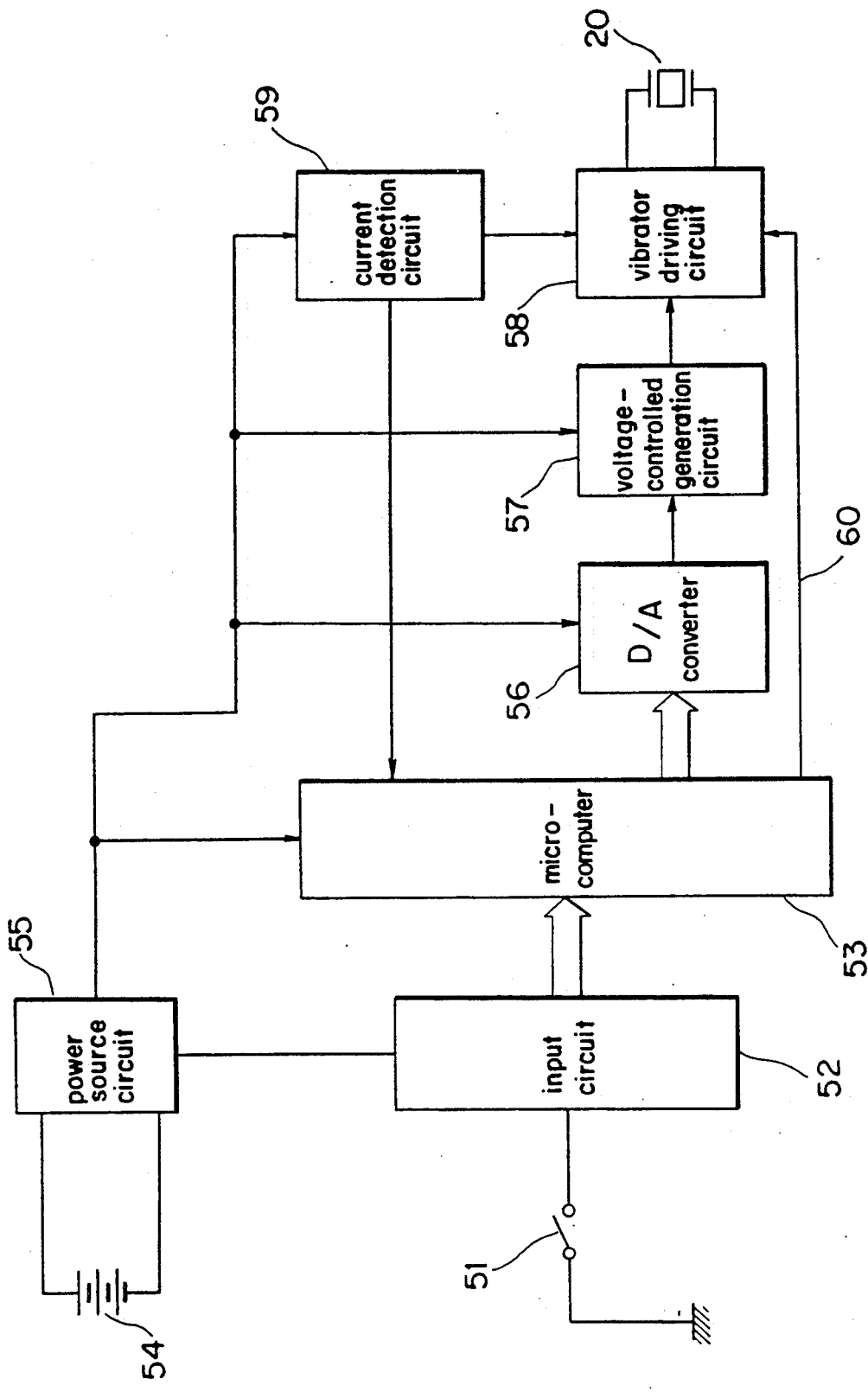
Figure 9:
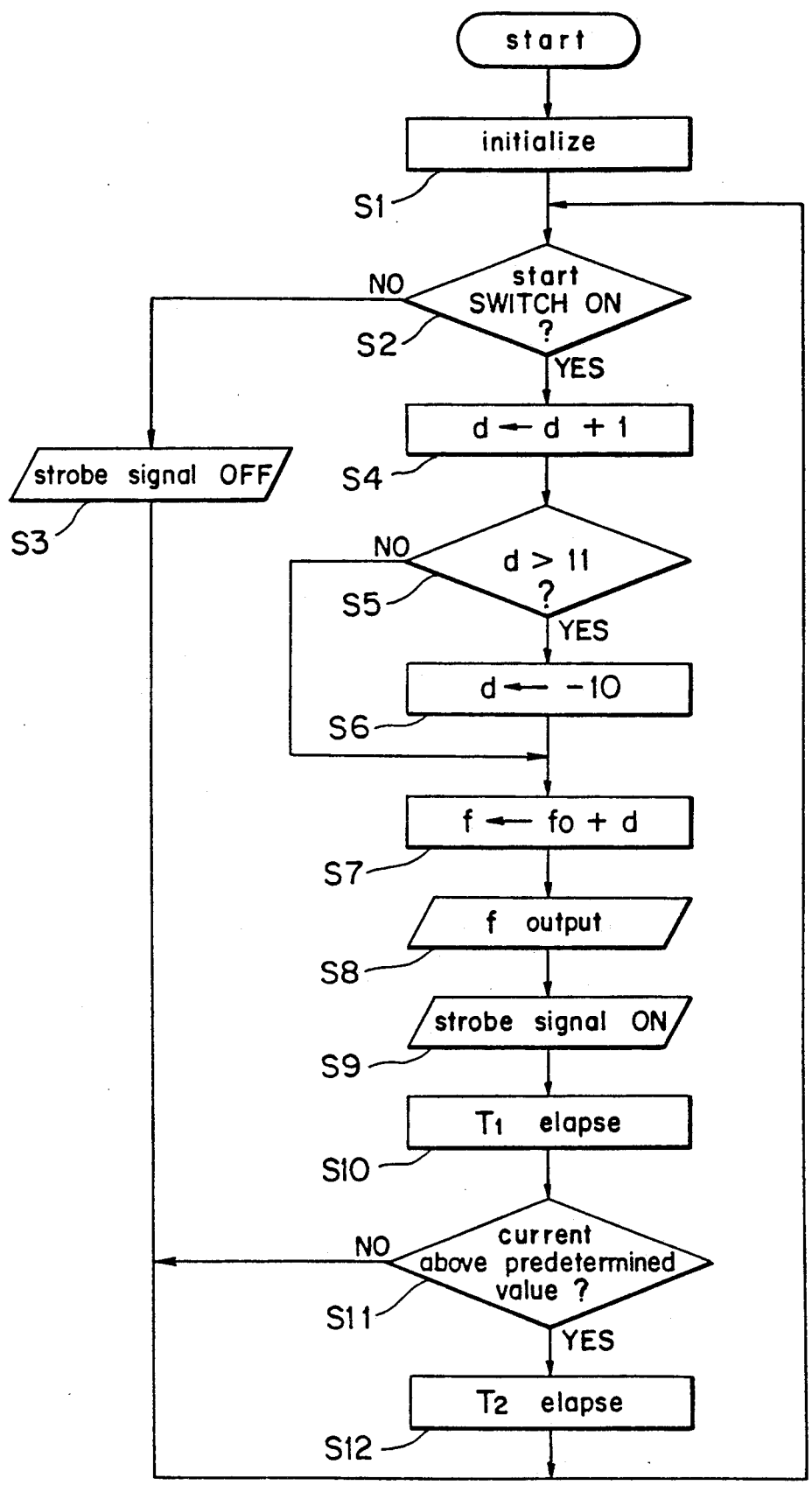
Figure 11:
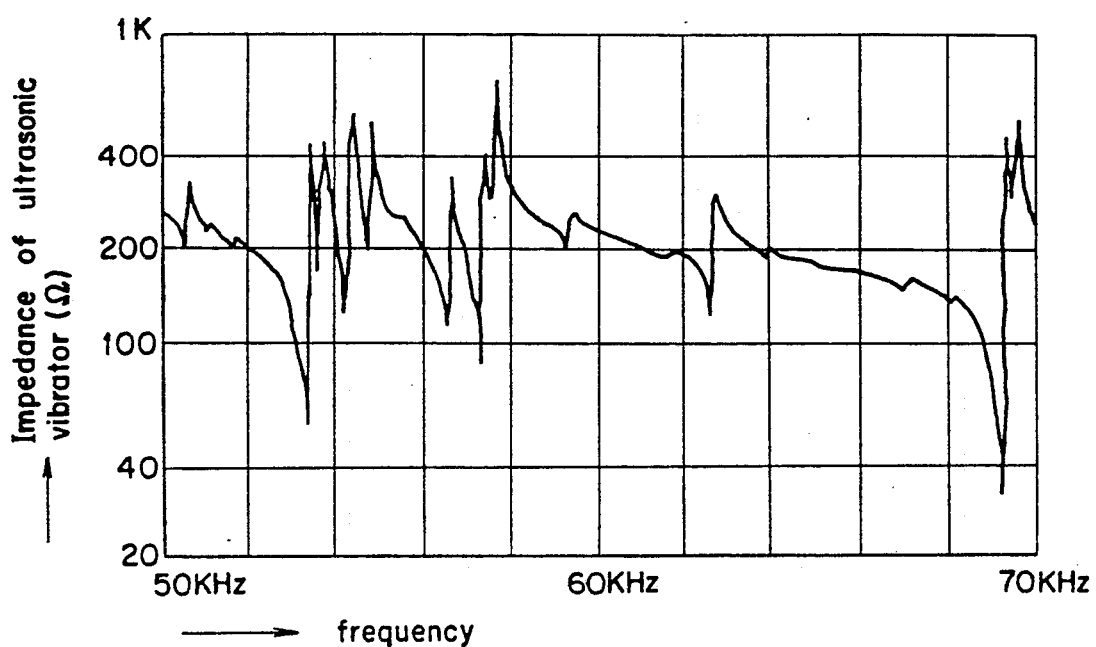
Figure 15:
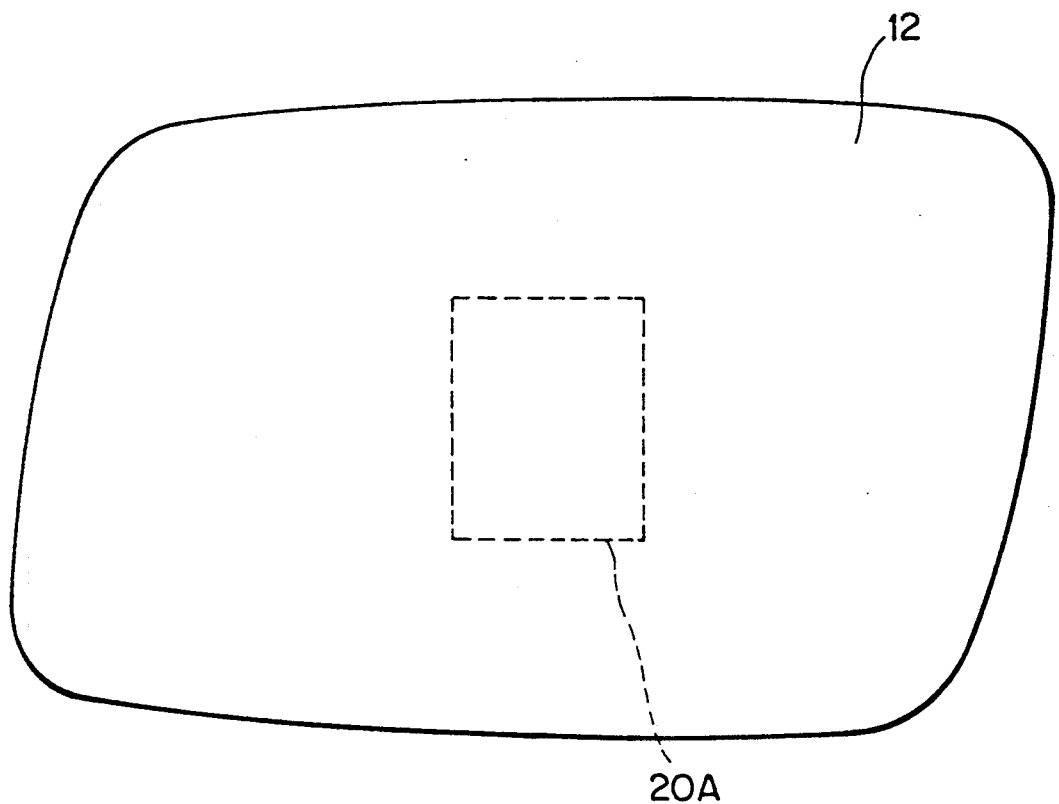
Figure 16:
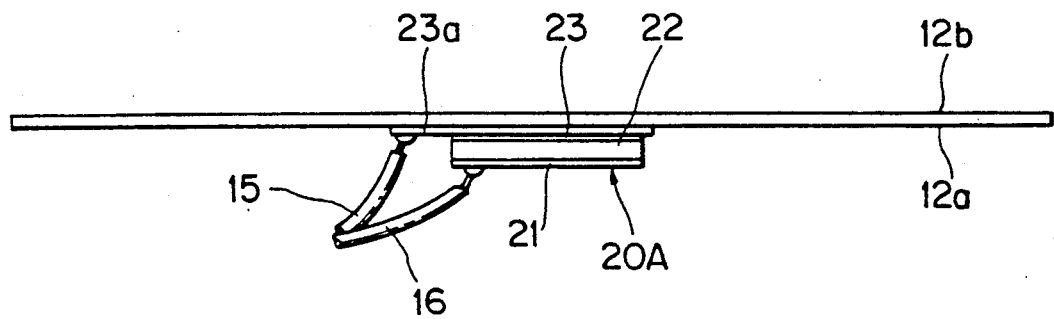
Figure 17:
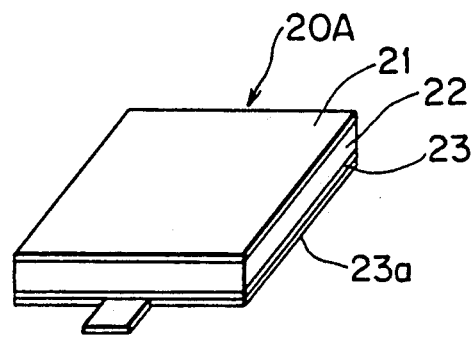
Figure 18A:
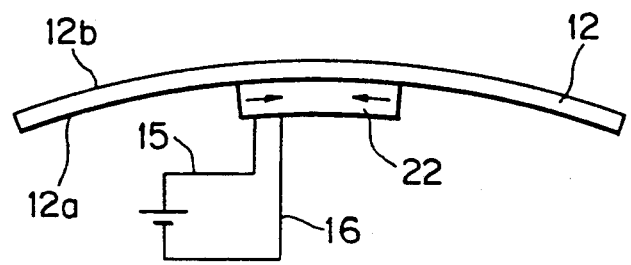
Figure 18B:
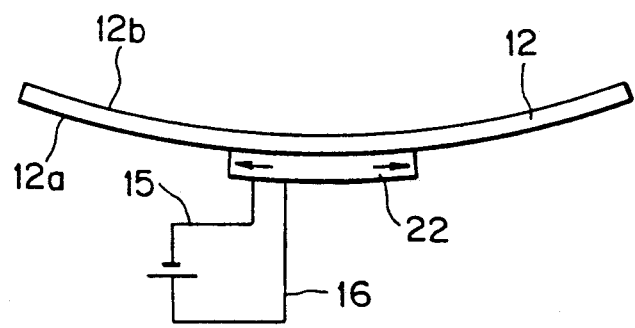
Figure 18C:
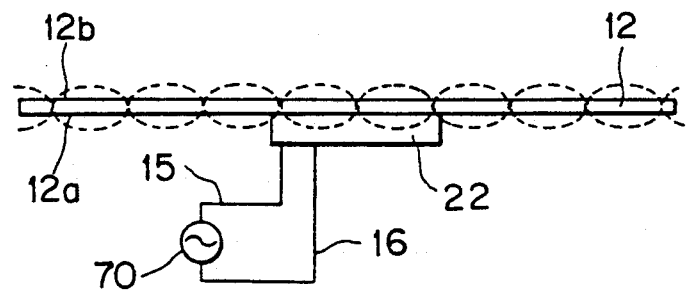
Figure 19:
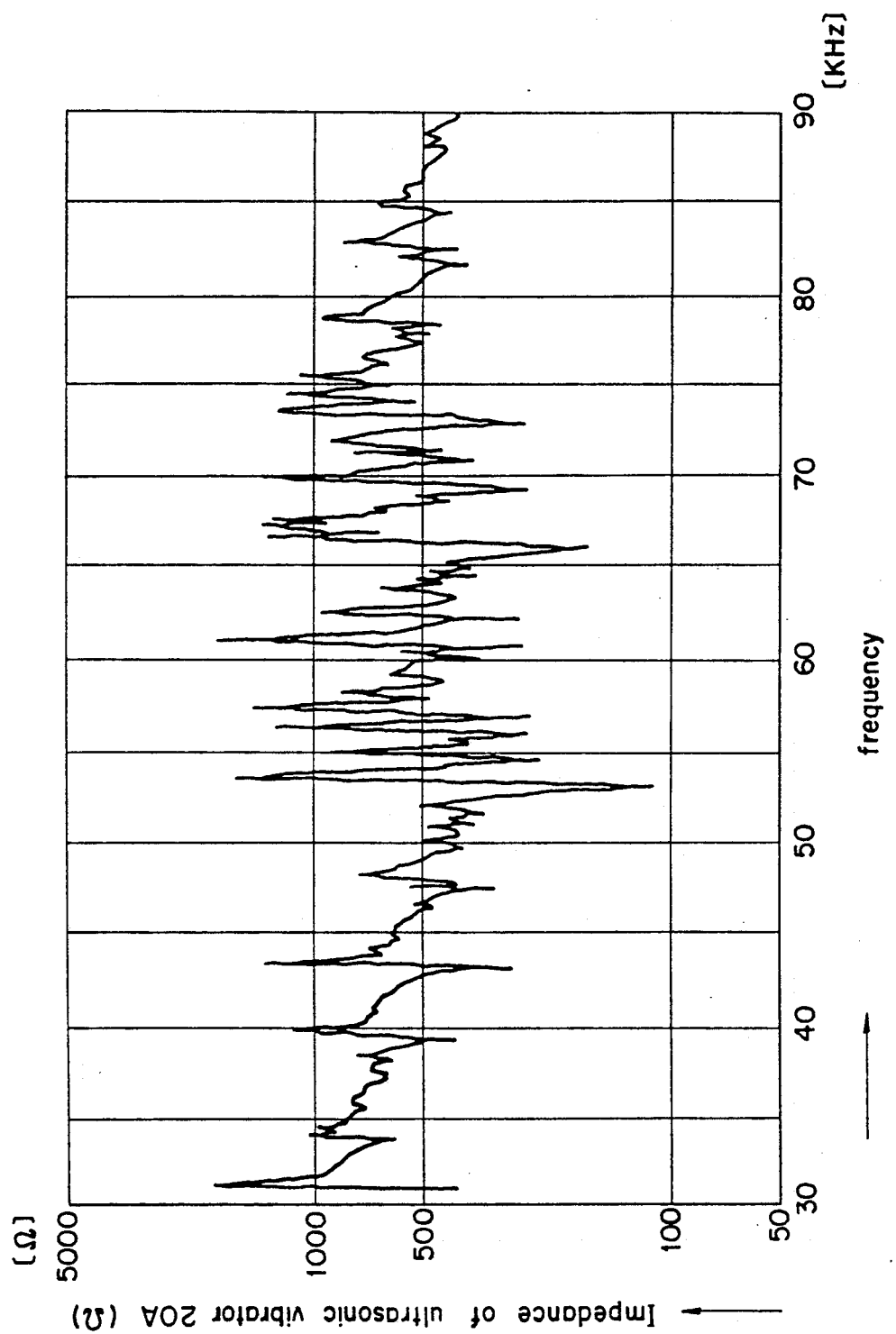
Figure 20:
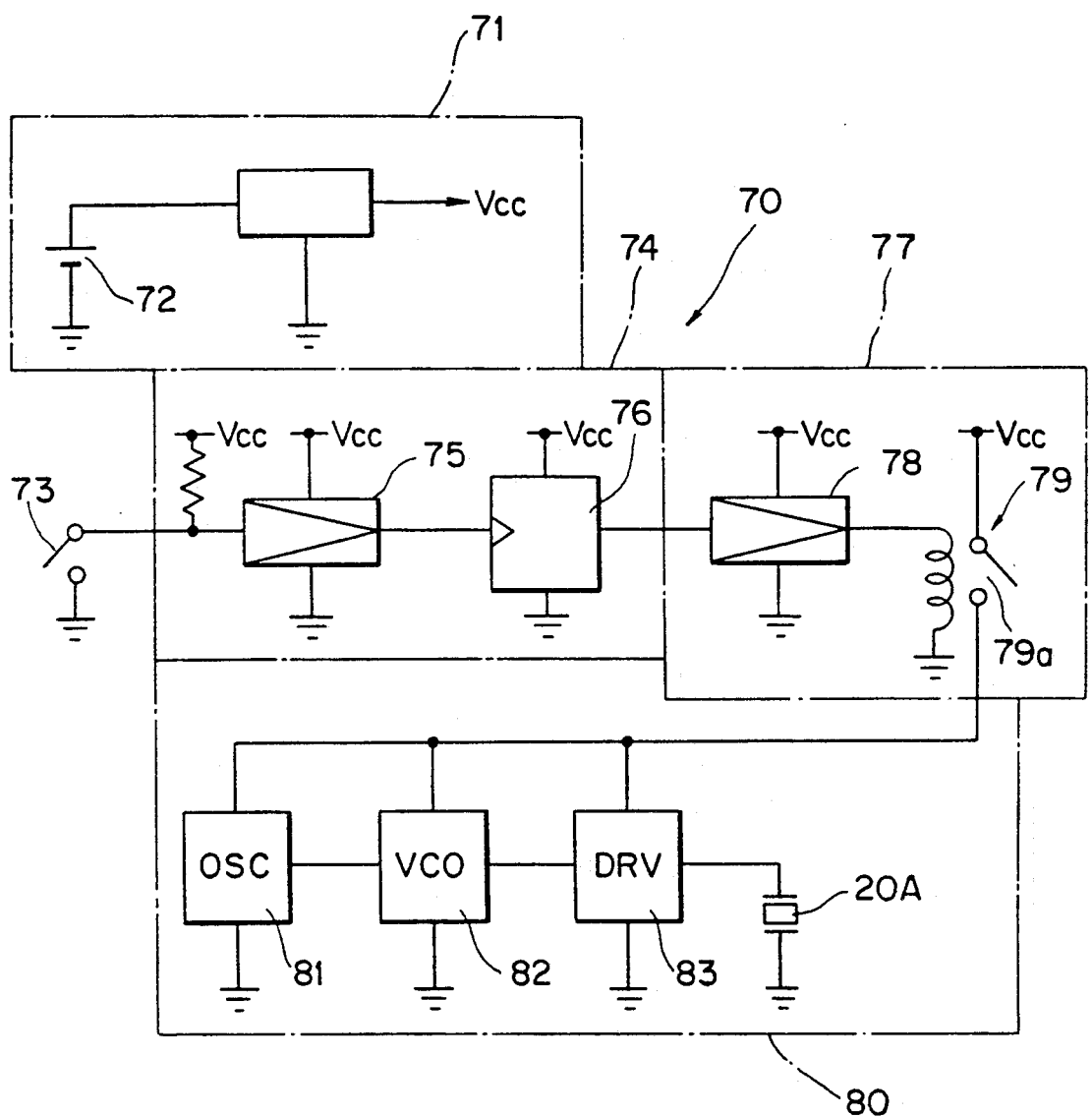
Figure 21:
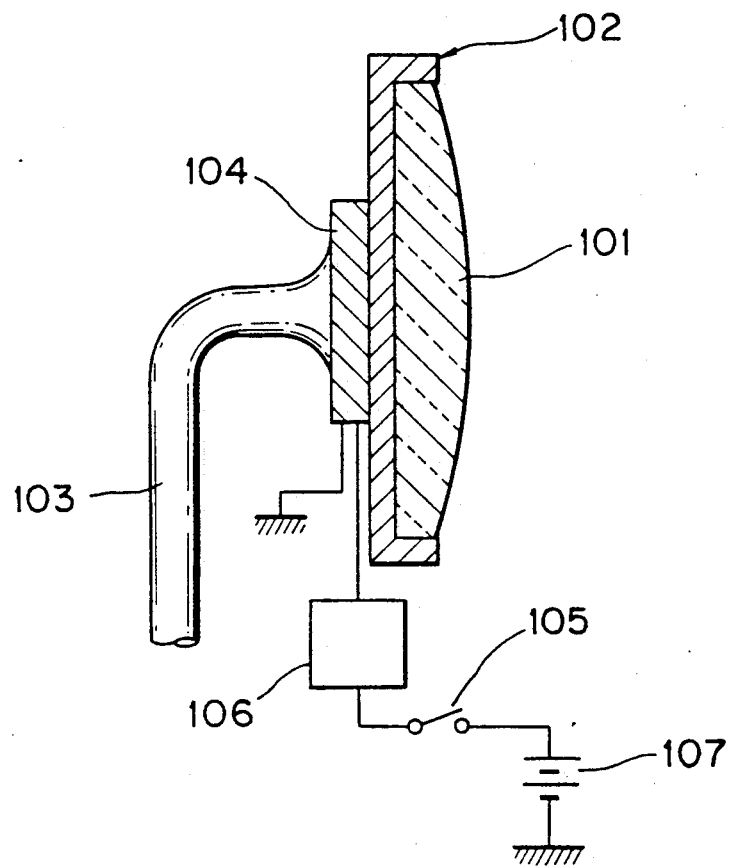

FIG. 4(a) through FIG. 4(c) are explanatory views for the bending wave in a device for removing water droplets used for an automobile mirror as a preferred embodiment according to the present invention;

FIG. 5 is a characteristic graph illustrating a relationship between the frequency and the impedance of the ultrasonic vibrator in a preferred embodiment according to the present invention;

FIG. 6 is a view illustrating the distribution of vibration amplitude in a case where the mirror is caused to vibrate by a ultrasonic vibrator in a preferred embodiment according to the present invention;

FIG. 7 is a constitutional view for a mirror main body in a device for removing water droplets of an automobile mirror in a preferred embodiment according to the present invention;

FIG. 8 is a entire constitutional view of a control device for electrically controlling a device for removing water droplets in an automobile mirror as a preferred embodiment according to the present invention;

FIG. 9 is a flow chart for controlling a device for removing water droplets of an automobile mirror in a preferred embodiment according to the present invention;

FIG. 10 is a characteristic graph illustrating a relationship between the limit input per unit area and the diameter of the ultrasonic vibrator used in a device for removing water droplets of an automobile mirror in a preferred embodiment according to the present invention;

FIG. 11 through FIG. 14 are, respectively, characteristic views each illustrating a relationship between the frequency and the impedance of a ultrasonic vibrator used in a device for removing water droplets of an automobile mirror in a preferred embodiment according to the present invention;

FIG. 15 is a front elevational view for a vehicle side mirror showing another embodiment according to the present invention;

FIG. 16 is a bottom view for the side mirror shown in FIG. 15;

FIG. 17 is a perspective view illustrating a ultrasonic vibrator in a further embodiment according to the present invention;

FIG. 18(a) through FIG. 18(c) are explanatory views for bending waves in a device for removing water droplets of a vehicle side mirror in the embodiment according to the present invention;

FIG. 19 is a characteristic graph illustrating a relationship between the frequency and the impedance of the ultrasonic vibrator used in the embodiment of the present invention;

FIG. 20 is a block diagram illustrating an oscillation circuit in a preferred embodiment according to the present invention; and FIG. 21 is a cross sectional view of a conventional device for removing water droplets of an automobile mirror disposed to the outside of a car.

DESCRIPTION OF THE PREFERRED EMBODIMENTS

The present invention is to be explained specifically referring to preferred embodiments shown in the appended drawings.

Figure 2:
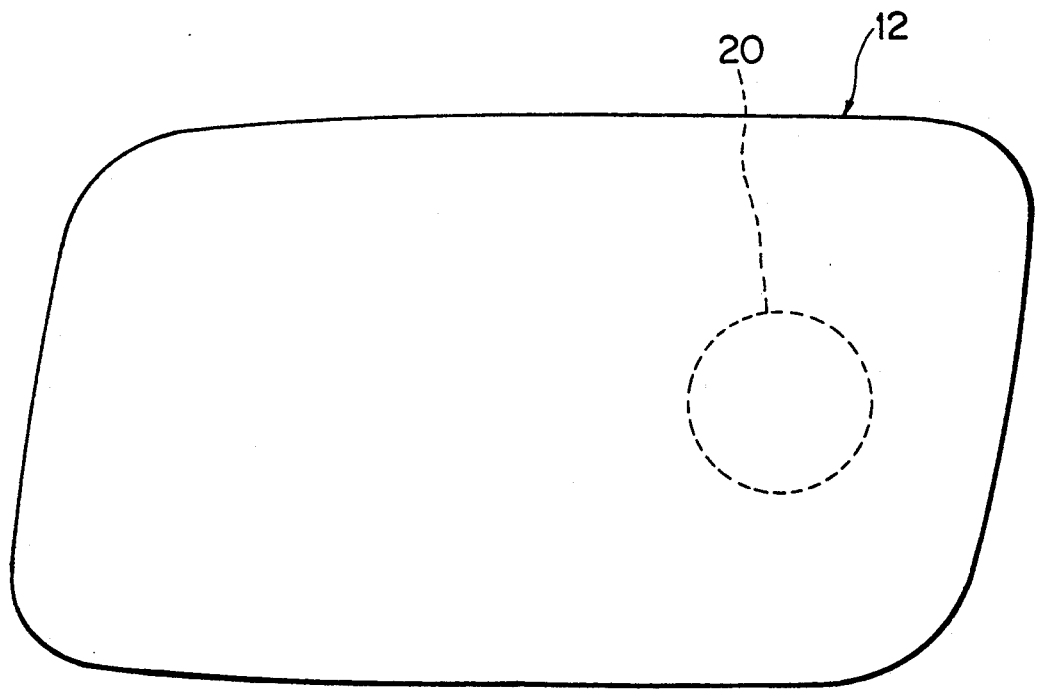
FIG. 2 is a front elevational view of a mirror in a device for removing water droplets used for an automobile mirror as a preferred embodiment according to the present invention.
Figure 3:
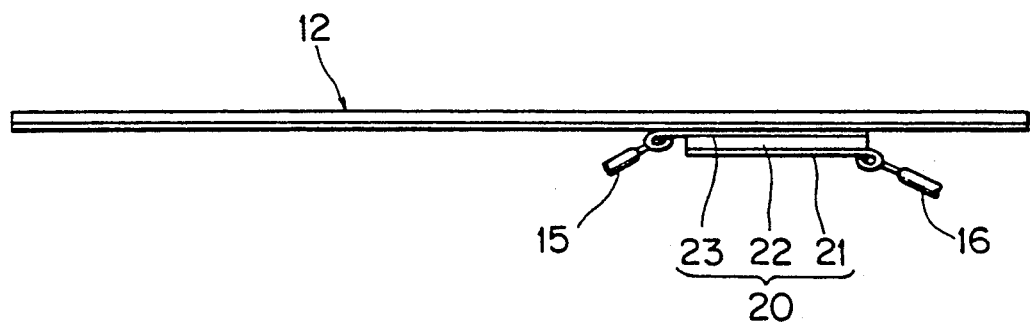
FIG. 3 is a bottom view of the mirror shown in FIG. 2.

FIG. 2 is a front elevational view of a mirror 12 in a device for removing water droplets in an automobile mirror as one embodiment according to the present invention, FIG. 3 is a bottom view for the mirror shown in FIG. 2, FIG. 4(a) through FIG. 4(c) are explanatory views for bending waves in the device for water droplets in an automobile mirror as one embodiment of the present invention, FIG. 5 is a characteristic graph showing a relationship between the frequency and the impedance of a ultrasonic vibrator in one embodiment according to the present invention and FIG. 6 is a distribution view for the amplitude of vibrations when the mirror 12 is vibrated by a ultrasonic vibrator 20.

In FIG. 2, FIG. 3, FIG. 4(a) through FIG. 4(c), a disk-like ultrasonic vibrator 20 is bonded by means of an adhesive at a portion of a mirror 12 on the side of a car body. Specifically, an electrode terminal 23 of the ultrasonic vibrator 20 on the side of the mirror is bonded to the rear face of the mirror 12. In particular, a ultrasonic vibrating element 22 comprising a piezoelectric effect element made of piezoelectric ceramics is used for the ultrasonic vibrator 20 in this embodiment. As shown in FIG. 3, the ultrasonic vibrator 20 comprises the electrode terminal 23 on the side of the mirror, an electrode terminal 21 on the opposite side to the mirror and a ultrasonic vibrating element 22. A lead wire 15 is bonded under pressure to the electrode terminal 23 on the side of the mirror, while a lead wire 16 is bonded under pressure to the electrode terminal 21 on the side opposite to the mirror by means of a press-bonding tool, etc. or by way of caulking, thereby being connected electrically and mechanically.

Also as shown in FIG. 3, when electric power is supplied between the lead wire 15 and the lead wire 16 for the electrode terminal 23 on the side of the mirror and the electrode terminal 21 on the opposite side of the mirror, the ultrasonic vibrator 20 expands or contracts in the direction of the thickness of the ultrasonic vibrator 20 (vertical direction in FIG. 3) and along the radial direction of the ultrasonic vibrator 20 (in lateral direction in FIG. 3).

That is, the ultrasonic vibrator 20 generally has a longitudinal effect of expanding or contracting in the same direction as that of the electric field applied and a lateral effect of expanding or contracting in the direction perpendicular to the direction of the electric field applied. Then, the vibrator has such a property that the resonance frequency due to the lateral effect is lower than that due to the longitudinal effect. Then, bending waves are generated to the mirror 12 utilizing the lateral effect in this embodiment. However, utilization of the longitudinal effect may sometimes be preferred in a certain type of mirrors having high resonance frequency. Accordingly, the present invention is not limited only to such an embodiment as generating bending waves to the mirror 12 by utilizing the lateral effect and the invention can also include those cases where the mirror 12 is expanded or contracted by utilizing the longitudinal effect.

The principle for bending the mirror 12 utilizing the lateral effect in this embodiment is to be explained specifically referring to FIG. 4(a) through FIG. 4(c).

At first, when a positive (+) terminal of a DC power source E is connected to the lead wire 15 and a negative (−) terminal of the DC power source E is connected to the lead wire 16, a strong contracting force is exerted radially due to the lateral effect in the ultrasonic vibrator 20, to bend the mirror 12 downward as shown in FIG. 4(a).

Further, when the negative (−) terminal of the DC power source E is connected to the lead wire 15, while the positive (+) terminal of the DC power source E is connected to the lead wire 16, a strong expanding force is exerted radially due to the lateral effect to the ultrasonic vibrator 20 to bend mirror 12 upwardly as shown in FIG. 4(b).

Then, when an output from an AC power source AC is supplied to the ultrasonic vibrator 20, the mirror 12 is bend repeatedly. In this case, when the frequency of the AC power is selected about to a multiple integer of the lowest resonance frequency of the mirror 12, the mirror 12 shows resonance to generate stationary waves of a great amplitude uniformly over the entire portion of the mirror 12. The surface of the mirror 12 vibrates at high velocity by the stationary waves. Then, water droplets deposited to the mirror surface are given with high kinetic energy from the mirror 12 and removed from the surface of the mirror 12 by being dropped gravitionally or being atomized, by which water droplets, etc. are removed from the surface of the mirror.

In this case, since an inherent resonance frequency determined by the shape of the ultrasonic vibrator 20 is present, it is necessary that the resonance frequency is determined while considering both of the resonance frequencies for the ultrasonic vibrator 20 and the mirror 12. By the way, a ultrasonic vibrator 20 having a resonance frequency if from 70 to 80 (KHz) by utilizing the inherent vibration of the mirror 12 present within a range - in this embodiment. However, from 70 to 80 (KHz) since the inherent vibration number is present in a range from lower to higher frequency, other frequency may also be used as described later.

Further, FIG. 5 shows electrical characteristics of the ultrasonic vibrator 20 in this embodiment obtained upon measurement by fixing a disk-like ultrasonic vibrator 20 having 30 mm diameter and 2.8 mm thickness at the gravitational center of a rectangular shape of a float sheet glass having lateral width: L=160 mm, longitudinal width: H=90 mm and thickness t=1.9 mm made of material according to JIS 3202 as a commercially available car mirror.

The ultrasonic vibrator 20 of this shape has a resonance frequency of about 70 KHz. Further, natural vibrational number of the mirror 12 is present at several positions in a rang from 70 to 80 KHz. It can be seen from the characteristic graph that the impedance of the ultrasonic vibrator 20 is abruptly lowered near 75 KHz. That is, it can be seen that the characteristics in which the resonance point of the mirror 12 and that of the ultrasonic vibrator 20 used in the measurement agree with each other are present near 75 KHz.

By the way, when electric power at 18 W is supplied to the ultrasonic vibrator 20, the kinetic velocity at the surface of the mirror 12 was about more than 300 mm/s at the center of the ultrasonic vibrator 20 and about more than 1000 mm/s at the outer periphery of the mirror 12.

In this case, since an inherent resonance frequency determined depending on the shape of the ultrasonic vibrator 20 is present, the resonance frequency has to be determined while considering both of the resonance frequencies for the ultrasonic vibrator 20 and the mirror 12. However, since the inherent vibrational number is present in a range from the lower to the higher frequency, any frequency may be used.

Further, as a result of various experiments made by the present inventors, et. al, it has been confirmed that if the position for fixing the ultrasonic vibrator 20 is changed, it causes no substantial change to the vibrations caused to the mirror 12. Accordingly, so long as the ultrasonic vibrator 20 is fixed at a portion of the mirror 12, vibrations substantially the same as those where the mirror 12 is fixed to the gravitational center can be obtained.

For instance, FIG. 6 shows amplitudes of vibrations of the mirror 12 in this embodiment at a certain instance. It can be seen from the distribution view that the loops and the nodes of the stationary waves are distributed substantially uniformly over the entire surface of the mirror 12 around the ultrasonic vibrator 20 as the center. The water droplets deposited to the surface of the mirror 12 are atomized at a position where the kinetic velocity is maximized, that is, at the loops of the stationary wave. Accordingly, although a small ultrasonic vibrator 20 as compared with the mirror 12 is used in this embodiment, water droplets can be removed from the entire surface of the mirror 12.

However, it can be seen from FIG. 6 that the vibrations on the surface of the mirror at a portion where the ultrasonic vibrator 20 is bonded to the mirror 12 are somewhat reduced since the rigidity of the mirror 12 is changed at that portion.

Further, when the disk-like ultrasonic vibrator 20 is used as in this embodiment, since the ultrasonic vibrator 20 expands and contracts in the radial direction, continuous bending waves surrounding the outer periphery of the ultrasonic vibrator 20 are generated to the mirror 20. Accordingly, by using the disk-like ultrasonic vibrator 20, uniform vibrations can be generated to the entire surface of the mirror 12 by using only one ultrasonic vibrator 20. In this embodiment, the oscillation frequency is varied to displace the loops and the nodes of the stationary waves generated to the mirror 12 so that there are no such droplets as not atomized in the nodes of the vibrations.

The mirror 12 and the ultrasonic vibrator 20 constituted as described above are embodied as a mirror main body as shown in FIG. 7.

In FIG. 7, a metal frame 2 is secured by way of tapping small screw 3 to the inside of a mirror case 1 made of synthetic resin and secured to a car body (not illustrated). A mirror base 4 made of synthetic resin is tiltably secured to the frame 2 both in vertical and horizontal direction by using a universal ball joint (not illustrated). Further, a mirror position driving device 5 is fixed by means of small screws to the frame 2. The mirror position driving device 5 has two output rods (not illustrated) which can respectively be driven independently. Each one end of the two output rods is connected to one surface of the mirror base 4 at different positions. When one or two output rod is driven by driver's manipulation, the mirror base 4 is tilted vertically or laterally. The two output rods of the mirror position driving device 5 are respectively covered with covers 6 or 7 made of synthetic rubber. One end of the cover 6 or the cover 7 is joined respectively to the housing for the mirror position driving device 5, while the other end of the cover 6 or the cover 7 is bonded to the mirror base 4. Bellows-like cover 6 or cover 7 is used so as not to hinder the tilting operation of the mirror base 4.

A mirror holder 8 made of synthetic resin or aluminum is joined to the mirror base 4. The mirror holder 8 has an engaging recesses 11 formed at the outer circumference thereof, along which a holder 9 made of synthetic rubber or synthetic resin such as urethane comprising material having smaller acoustic impedance than that of the mirror 12 is inserted and fixed along the entire circumference of the mirror 12. The engaging recess 11 hold therebetween the entire circumference of the mirror 12 by means of the holder 9, by which the mirror 12 is secured to the mirror holder 8.

Then, on the side of the mirror case 1 of the mirror base 4, a vibrator control device 14 is disposed between the mirror base 4 and the mirror case 1. The vibrator control device 14 incorporates a voltage-controlled oscillation circuit, a power source circuit, etc. for driving the ultrasonic vibrator 20. The vibrator control device 14 is driven and controlled by a start switch disposed to the inside of the car. Further, the vibrator control device 14 is connected electrically and mechanically at a connector portion disposed to the mirror holder 8. Mold material is embedded between the rear face of the mirror 12 and the electrode terminal 21 on the side opposite to the mirror, to make interference of the vibrations between both of them.

Then, explanation is to be made for the entire structure of a control device for electrically controlling the device for removing water droplets of an automobile mirror in this embodiment shown in FIG. 8.

In the figure, a start switch 51 is disposed at such a position as can be easily manipulated by a driver in an automobile who drives the water droplet removing device of the automobile mirror in this embodiment. The start switch 51 is connected by way of an input circuit 52 to a microcomputer 53 and adapted to input "L" when it is turned ON while input "H" when it is turned OFF to the input circuit 52.

The microcomputer 53 has electric supply from a power source circuit 55 supplied with electric power from a car battery 54.

The output from the microcomputer 53 is supplied to oscillation means comprising a D/A converter 56, a voltage-controlled oscillation circuit 57 and a vibrator driving circuit 58.

That is, the frequency of the AC power supplied to the ultrasonic vibrator 20 is supplied from the vibrator driving circuit 58. The input for the vibrator driving circuit 58 is supplied from the voltage-controlled oscillation circuit (V-F conversion circuit) 57 and the output frequency from the voltage-controlled oscillation circuit 57 is supplied by the output voltage from the D/A converter 56, and the output voltage of the D/A converter 56 is controlled by a digital signal from the microcomputer 53. Then, the analogue output voltage from the D/A converter 56 is always supplied to the voltage-controlled oscillation circuit 57, while the voltaged-controlled oscillation circuit 57 applies an output of a predetermined frequency to the vibrator driving circuit 58. The output from the vibrator driving circuit 58 is controlled by a strove signal 60 outputted from the microcomputer 53 and the vibrator driving circuit 58 supplies an AC power at a predetermined frequency to the ultrasonic vibrator 20 only when the strove signal 60 is ON.

Further, when the electric current supplied by way of the vibrator driving circuit 58 to the ultrasonic vibrator 20 is greater than a predetermined value, the electric current detection circuit 59 sends "H" signal to the microcomputer 53. The current detection circuit 59 functions as resonance point detection means that detects the resonance frequency of the frequency to be supplied to the ultrasonic vibrator 20.

ROW in the microcomputer 53 contains a control program for controlling the water droplet removing device of the automobile mirror in this embodiment and performs the following control.

FIG. 9 is a flow chart for conducting the control for the water droplet removing device of the automobile mirror in one embodiment according to the present invention.

At first, simultaneously with the connection of the electric power source, initialization is conducted at step S1, condition of the start switch 51 is judged at step S2 and, if the start switch 51 is OFF, the strove signal 60 is maintained OFF at step S3. When the start switch 51 is turned ON, the value d in a the constant counter corresponding to the frequency width to be varied for once is incremented by "1" at step 4 (d←d+1). At step S5, it is judged whether the value d in the constant counter exceeds "11" or not. At the initial stage upon entering the routine, since the value d for the constant counter does not exceed "11", the frequency f outputted to the ultrasonic vibrator 20 is set as "of+d" at step S7. Then, the frequency f is prepared into a predetermined digital signal in the microcomputer 53 at step S8, which is outputted to D/A converter 56 as an input for the voltage-controlled oscillation circuit 57. Then, the strobe signal is turned ON and frequency: f=of+d is outputted to the ultrasonic vibrator 20 at step S9. Further, the state of output is continued till the elapse of T1 second by a timer at step S10 and the output from the current detection circuit 59 is judged at step 11. If the output is lower than a predetermined current value, the routine from the step S2 is executed repeatedly and the value d in the constant counter is incremented by "1" at step S4. If it is judged that the value d in the constant counter exceeds "11" at step S5, "−10" is subtracted from the value d in the constant counter at step S6, the frequency f outputted to the ultrasonic vibrator 20 is set to the initial value "1" at step S7, which is outputted through step S7 to step S9 and the operations are repeated hereinafter.

Meanwhile, the value d in the constant counter is incremented by "1" at step S4, the frequency f outputted to the ultrasonic vibrator 20 is set to "of+d" at step S7 and, through the steps S8 and S9, the frequency: f=of+d is outputted to the ultrasonic vibrator 20 till the timer elapses T1 second. As a result, the output from the current detection circuit 59 is judged at step S11 and, if it exceeds a predetermined current value, the output f=of+d to the ultrasonic vibrator 20 is kept fixed at step S7 till the timer has elapsed T2 second at step S12 and the frequency is outputted to the ultrasonic vibrator 20 to continue the operation of the ultrasonic vibrator 20 for T2 second.

Accordingly, till the frequency applied to the ultrasonic vibrator 20 reaches a predetermined frequency, the frequency is continued to be increased. Then, if the output from the current detection circuit 59 is judged to exceed a predetermined current value, it is judged as a resonance frequency where the resonance current is maximized. This causes the ultrasonic vibrator 20 to expand or contract in the radial direction and continuous bending waves surrounding outer periphery of the ultrasonic vibrator 20 are generated in the mirror 12. Accordingly, by the disk-like ultrasonic vibrator 20, oscillations of uniform bending waves can be generated over the entire portion of the mirror 12 even by using only one ultrasonic vibrator 20.

Experimental Example

For the mirror 12 and the ultrasonic vibrator 20 used as described above, a result as shown by the characteristic graph for the ultrasonic vibrator diameter-input limit per unit area in FIG. 10 can be obtained. Assuming the lateral width as L, longitudinal width as H and the thickness as t for the mirror 12, the thickness T is from 0.5 to 5t (mm) and the diameter D is from 20 to 50 (mm) for the ultrasonic vibrator 20. The mirror 12 used was a usual automobile mirror comprising float sheet glass made of material in accordance with JIS 3202 having the lateral width: L=160 (mm), longitudinal width: H=90 (mm) and the thickness t=1.9 (mm) for the mirror 12. In this case, for removing water droplets deposited to the mirror 12, more than 10 W of the input is required for the ultrasonic vibrator 20. Furthermore, for removing water droplets of less than 100 (um) size, input of greater than 25 W was necessary. That is, the input greater than 25 W is an optimum input for the device for removing water droplets of an automobile mirror.

Further, in view of the experiment, it is necessary that the ultrasonic vibrator 20 has a diameter d of greater than 20 mm and of greater than 40 mm capable of receiving greater input for removing atomized water droplets. Then, if an input exceeding an allowable level was supplied to the ultrasonic vibrator 20, cracking was caused to the ultrasonic vibrator 20 due to the increase in the heat generation and the internal stress to the ultrasonic vibrator 20. Taking such an allowable input into consideration, more than 30 mm of diameter D is necessary for the ultrasonic vibrator 20.

Figure 1:
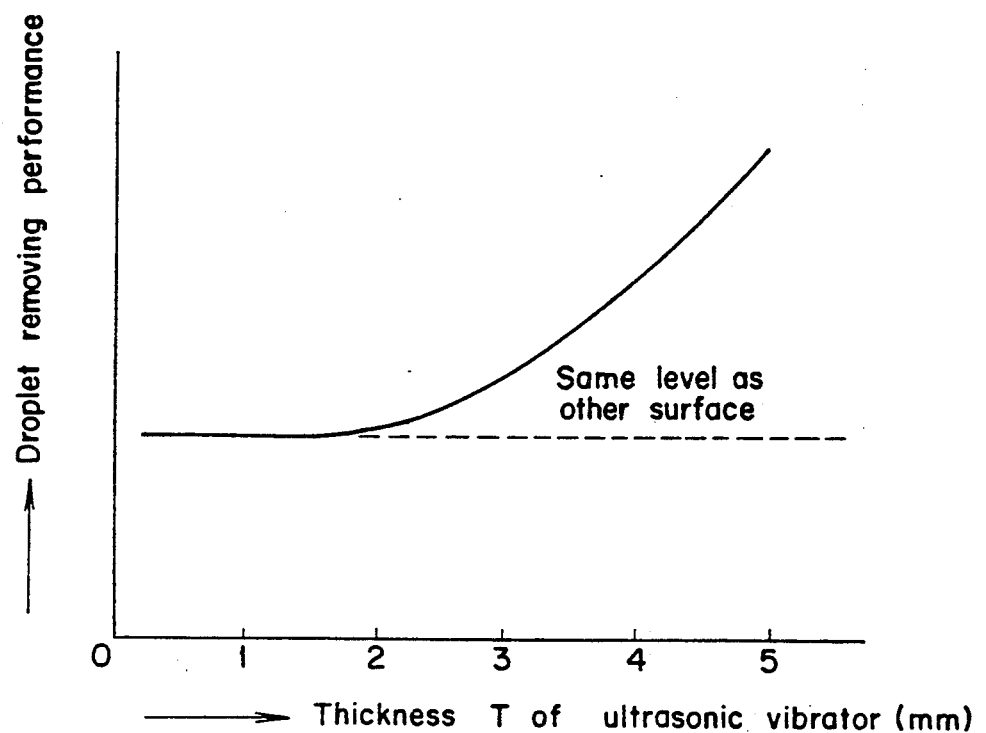

In view of the result of the experiment described above, if the diameter D for the ultrasonic vibrator 20 was set to 40 mm, a result as shown in the characteristic graph for the thickness d the ultrasonic vibrator-performance for removing water droplets in FIG. 1 was obtained.

In a case of using the ultrasonic vibrator 20 of 40 mm diameter with large plate thickness T within a range not exceeding the input limit, since the surface of the mirror 12 bonded with the ultrasonic vibrator 20 has greater rigidity as compared with other mirror surface not bonded with the ultrasonic vibrator 20, the amplitude rate of the vibrations at that portion of the mirror surface is reduced to less than 1/5 as compared with other portion and no substantial water droplets can be removed. Further, as the thickness T of the ultrasonic vibrator 20 is reduced, the rigidity for the portion bonded with the ultrasonic vibrator 20 becomes similar to that at other mirror surface not bonded with the ultrasonic vibrator 20 and both of the portions are put into a similar resonance condition. The amplitude ratio of the vibrations at that portion of the mirror surface is about 4/5 for that of other portions, by which similar effect can be attained to that in other mirror portion and water droplets can be removed from almost of the entire surface.

That is, according to the experiment conducted while changing the plate thickness, the water droplets can completely be removed from the mirror surface also at the portion bonded with the ultrasonic vibrator 20 in the same way as other portions of the ultrasonic vibrator 20 in a case where the plate thickness is less than 2.5 mm and, particularly, less than 2 mm.

In the present embodiment, water droplets at the surface of the mirror are completely removed by utilizing the composite resonance between the mirror 12 and the ultrasonic vibrator 20. Electric property of the ultrasonic vibrator 20 having the thickness T from 1 to 2.5 mm is as shown in the characteristic graph for frequency ultrasonic vibrator impedance in FIG. 11 through FIG. 14.

Figure 12:
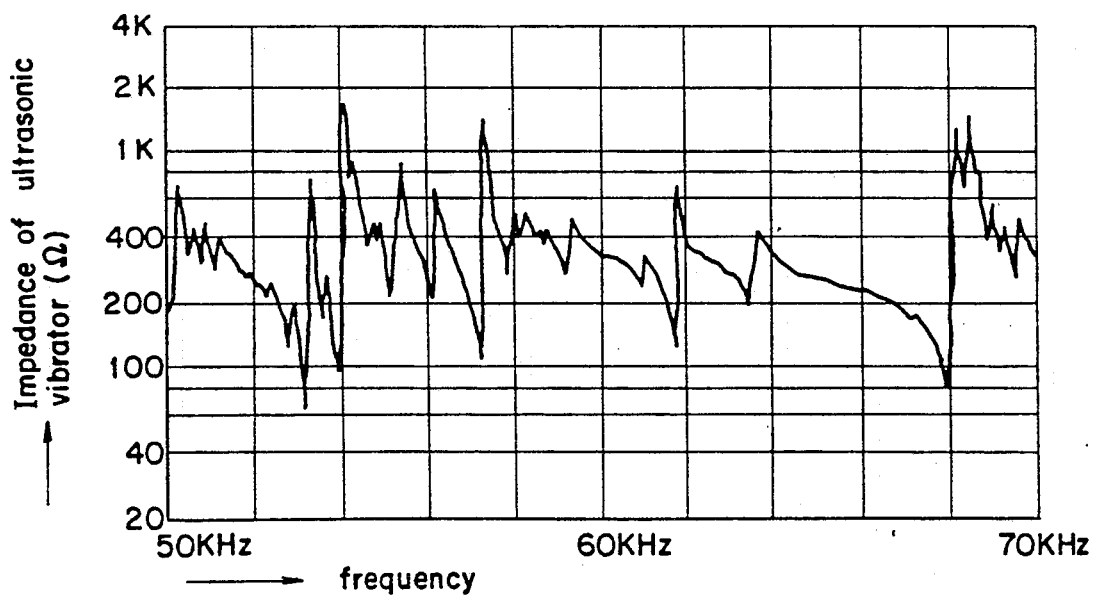
Figure 13:
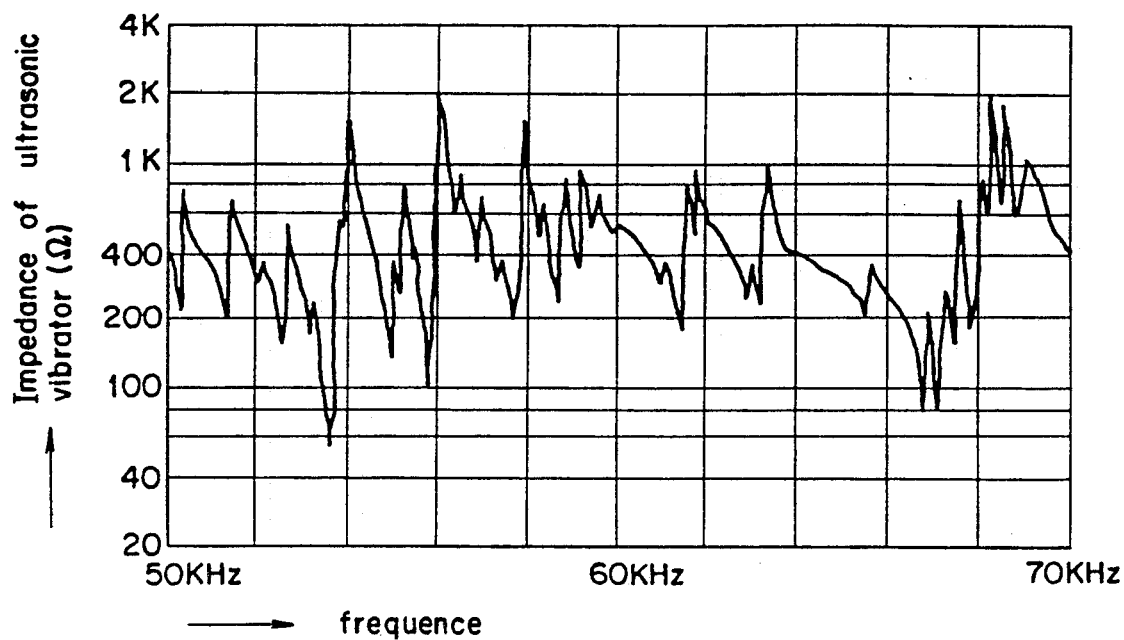
Figure 14:
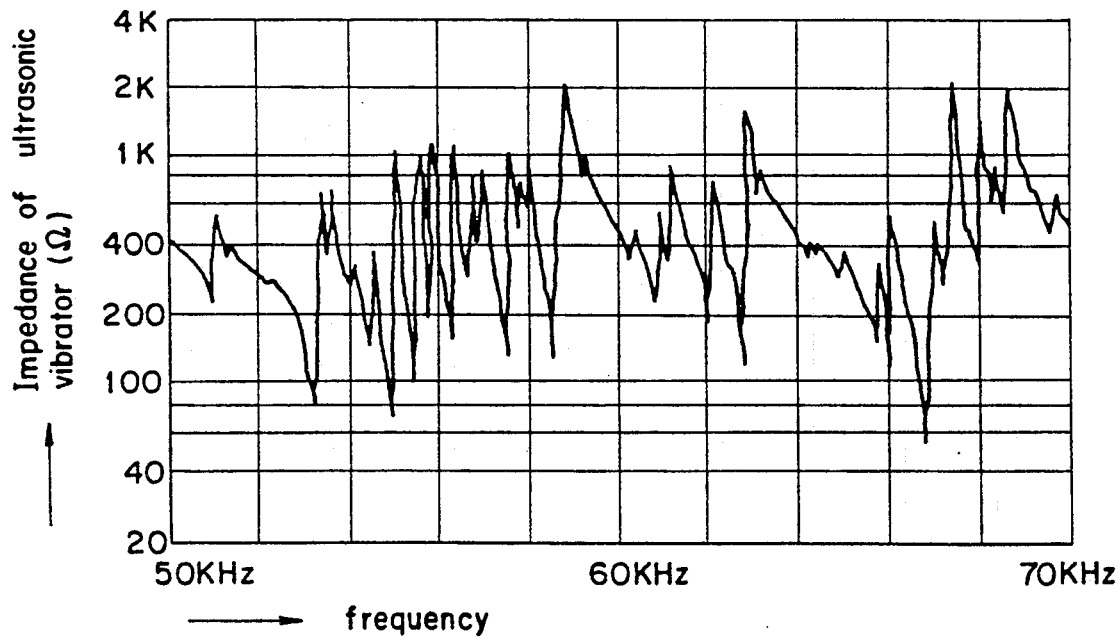

That is, in a case where the thickness T of the ultrasonic vibrator 20 is 1 mm, composite resonance is present at one position within a range from 53 to 54 KHz. In a case where the thickness T of the ultrasonic vibrator 20 is 1.5 mm, composite resonance states are present at two positions within a range from 53 to 54 KHz as shown in FIG. 12. Further, it can be seen that as the thickness T of the ultrasonic vibrator 20 is increased as 1, 1.5, 2, 2.5 mm, the frequency density reaching the resonance is increased as show in FIG. 11 through FIG. 14. This means that a ultrasonic vibrator 20 of smaller thickness T can not generate oscillations at high efficiency by utilizing the composite resonance because of less composite resonance state, requires longer time for removing the water droplets at the mirror surface and results in problems of heat generation etc. by so much. Further, a ultrasonic vibrator 20 of larger thickness T, can generate vibrations at high efficiency utilizing the composite resonance because of a lot of composite resonance states to enable to remove water droplets from the surface of the mirror even in a shorter period of time. Accordingly, as the thickness T of the ultrasonic vibrator 20 is increased, water droplets can be removed at higher efficiency.

As described above, when using the ultrasonic vibrator 20 in the device for removing water droplets of an automobile mirror, if the thickness is reduced, the heat capacity of the ultrasonic vibrator 20 can be reduced. However, since it is readily bent because of the reduced thickness, the heat generated is also increased. Accordingly, the ultrasonic vibrator 20 is locally heated to possibly lead to degradation, cracking, etc. in the ultrasonic vibrator 20.

On the contrary, if the thickness T of the ultrasonic vibrator 20 is increased in excess of about 4 mm, the internal stress is increased by so much as the thickness of the ultrasonic vibrator 20 is increased, if it is intended to obtain an oscillation amplitude rate required for transporting necessary kinetic energy for the atomization to the water droplets, thereby increasing the possibility for the cracking.

In addition, if the diameter D of the ultrasonic vibrator 20 is increased in excess of about 50 mm, the radial displacement due to the lateral effect is increased to cause extremely large inner stress partially in the mirror 12, upon transmitting the bending vibrations to the mirror 12 to possibly cause cracking to the mirror 12. For the ultrasonic vibrator 20 with the diameter of 50 mm, the internal stress of the mirror 12 which is partially greater than 600 kg/cm$^2$ was measured and it was comformed that the value near the limit for the internal stress.

On the other hand, if the diameter D of the ultrasonic vibrator 20 is reduced to less than about 20 mm, the radial displacement due to the lateral effect is decreased. However, since the thickness T can be increased by the reduction in the diameter D to increase the resonance frequency in the radial direction, the density of the composite resonance frequency with the mirror 12 is increased. Accordingly, if it is possible to put a value greater than a predetermined level, it is advantageous to reduce the diameter D for the ultrasonic vibrator 20.

Accordingly, in a device for removing water droplets of an automobile mirror comprising a mirror 12 having a predetermined radius of curvature, a ultrasonic vibrator 20 bonded to the rear face of the mirror 12, and oscillation means comprising a D/A converter 56 for oscillating the ultrasonic vibrator 20 at a specific frequency, a voltage-controlled oscillation circuit 57 and a vibarator driving circuit 58, the mirror 12 made of material that can be used for automobiles is defined for the thickness, etc. Assuming the thickness of the mirror 12 as t, preferred experimental results were obtained by setting the thickness T for the ultrasonic vibrator 20 within a range from : $0.25t \leq T \leq 2.5t$. Thus, it is possible to decrease the effect of the thickness of the ultrasonic vibrator 20 and enables uniform removal of water droplets on the surface of the mirror. Further, the ultrasonic vibrator 20 even in a constrained state, can provide sufficient power. Then, the characteristics between both of them can be aligned with those of the automobile mirror during use.

In particular, when an automobile mirror comprising float sheet glass made of material in accordance with JIS 3202 and having thickness t=1.9 is used as the mirror, the thickness T of the ultrasonic vibrator 20 is within a range: 5 mm$\leq$T$\leq$5 mm.

Further, in a device for removing water droplets for automobile mirror comprising a mirror 12 having a predetermined radius of curvature, a ultrasonic vibrator 20 bonded to the rear face of the mirror 12 and an oscillation means comprising a D/A converter 56 for causing the ultrasonic vibrator 20 to bending vibration by means of lateral effect at a specific frequency, a voltage-controlled oscillation circuit 57 and a vibrator driving circuit 58, assuming the lateral width as L and the longitudinal width as H for the mirror 12, satisfactory experimental results were obtained by setting the diameter D for the ultrasonic vibrator 20 as at least one of ranges:

$D \leq L/3$ and $D \leq H/3$.

That is, when the bending vibrations due to the lateral effect of the ultrasonic vibrator 20, i.e., radial change of the vibrator, are transmitted to the mirror 12, the inner stress of the mirror 12 is partially increased as the diameter of the ultrasonic vibrator 20 is increased. Since the mirror 12 made of material that can be used for automobiles is restricted for the lateral width L, longitudinal width H, etc. Preferred state of use can be attained by setting the diameter D of the ultrasonic vibrator 20 as at least one of ranges: $D \leq L/3$ and $D \leq H/2$, which can prevent the destruction of the mirror 12, in view of the lateral width L and the longitudinal width H of the mirror.

In particular, when an automobile mirror comprising a float sheet glass made of material in accordance with JIS 3202 and having lateral width L = 162 mm, the longitudinal width H = 90 mm and the thickness t = 1.9 mm as the mirror 12, preferred experimental results were obtained by setting the diameter D for the ultrasonic vibrator 20 as : $20 \leq D \leq 60$ mm.

Naturally, when both of the conditions for the thickness T and the diameter D of the ultrasonic vibrator for the mirror 12 can be satisfied simultaneously, use under the best condition is possible. Further, when using an automobile mirror comprising float sheet glass made of material in accordance with JIS 3202 and having lateral width L = 160 mm, the longitudinal width H = 90 mm and the thickness = 1.9 mm as the mirror 12, similar effect can also be obtained although there is some difference in the dimensional accuracy.

By the way, oscillation means for oscillating the ultrasonic vibrator in the previous embodiment at a specific frequency comprises the D/A converter 56, the voltage-controlled oscillation circuit 57 and the vibrator driving circuit 58. However, the present invention is not restricted only to this embodiment, but the use of a circuit capable of driving the ultrasonic vibrator 20, for example, a self-oscillation type circuit, external-oscillation circuit, etc. can be used.

Further, the present invention is to be explained referring to another preferred embodiment.

FIG. 15 is a front elevational view of an automobile side mirror using a device for removing water droplets in the present embodiment. FIG. 16 is a bottom view for the side mirror shown in FIG. 15 and FIG. 17 is a perspective view illustrating a ultrasonic vibrator 20A.

About at the center of the mirror 12, a rectangular ultrasonic vibrator 20 A formed with a piezoelectric element having the identical structure as that in the previous embodiment is secured by means of adhesives. The vibrator 20 A comprises a ultrasonic vibrating element 22 and electrode terminals 21, 23 formed integrally to both end faces thereof.

A lead electrode terminal 23a is electrically bonded to the electrode terminal 23. A lead wire 15 is soldered to the lead electrode terminal 23a, while a lead wire 16 is soldered to the electrode terminal 21 respectively.

When electric power is inputted to the lead wires 15, 16, the ultrasonic vibrator 20A expands or contracts in the direction of the thickness (vertical direction in FIG. 16) and along the direction of the sides (lateral direction in FIG. 16), that is, in the direction in parallel with each of the sides.

Referring now to FIG. 18a, when a positive (+) terminal of the power source is connected to the lead wire 15 and a negative (−) terminal of the power source is connected to the lead wire 16, the ultrasonic vibrator 20A contracts mainly in the direction of the side. In this case, an intense contracting force exerts on the rear face 12a of the mirror 12 to bend the mirror 12.

Referring then to FIG. 18b, when the negative (−) terminal of the power source is connected to the lead wire 15 and the positive (+) terminal of the power source is connected to the lead wire 16 in the manner opposite to that shown in FIG. 18a, the ultrasonic vibrator 20A expands mainly along the direction of the side. In this case, an intense expanding force is exerted to the rear face 12a of the mirror 12 to bent the latter in the direction opposite to that shown in FIG. 18a.

Referring then to FIG. 18c, when an oscillation circuit 70 is connected to the ultrasonic vibrator 20A and AC power is applied to the ultrasonic vibrator 20A, the mirror 12 is bent repeatedly.

Then, when the frequency for the AC power is selected to an appropriate frequency, the mirror 12 causes resonance and the entire portion of the mirror 12 generates uniform vibrations with large amplitude. Under the vibrations, the reflection surface 12a of the mirror 12 moves at high velocity. In this case, the water droplets deposited to the reflection surface 12b are given with high kinetic energy from the mirror 12 and removed from the reflection surface 12b of the mirror 12 by being dropped gravitationally or being atomized.

Since the ultrasonic vibrator 20A used in the device in this embodiment has a rectangular shape, it has at least two resonance frequencies in the direction of the longer side and the shorter side. Generally, the resonance frequency in the direction for each of the sides is defined by the following equation (1).

$$f = \frac{N}{L} \tag{1}$$

where
f: resonance
N: frequency constant
L: length for each of the sides

In the device according to this embodiment, a ultrasonic vibrator 20A with $L_1 = 35$ mm, $L_2 = 30$ mm frequency for the ultrasonic vibrator 20A is: $f_1 = 45$ KHz along the longer side and $f_2$ is 53 KHz along the shorter side.

Thus, since the ultrasonic vibrator 20A has an inherent resonance frequency determined depending on the shape, the device according to this embodiment may be manufactured by determining the shape of the ultrasonic vibrator 20A while considering the resonance frequency of the mirror 12.

For instance, electric characteristics of the ultrasonic vibrator 20A of the device according to this embodiment are shown in FIG. 19. The electric characteristics shown in FIG. 19 are measured by fixing a ultrasonic vibrator 20A of a rectangular shape sized 35×30

(mm)×2.8 (mm) thickness to a general automobile side mirror marketted at present (rectangular shape of about 160 mm×90 mm).

It can be seen from the graph that the impedance of the ultrasonic vibrator 20A is remarkably reduced near 53 KHz. That is, it can be seen that the mirror 12 used for the measurement causes resonance at about 53 KHz in a state where the ultrasonic vibrator 20A is fixed.

It is to be noted that the mirror 12 can of course cause resonance at other frequency than 53 KHz mentioned above since there are a lot of resonance frequencies in a range from lower to higher frequency for the mirror 12.

By the way, at a position where the kinetic velocity is minimized, that is, at the nodes of the vibrations generated on the mirror 12, it takes a longer time for atomizing the water droplets as compared with the portion of loops for the vibrations. Therefore, as the mirror 12 starts to vibrate, fine droplets remain at the portion of nodes of the vibrations to sometime bring about clouded appearance at the reflection surface 12b of the mirror 12. The clouding may be removed by continuously vibrating the mirror 12 for an appropriately short period of time. However, it is of course preferred that such clouding is not caused. Further, if the mirror 12 is continuously vibrated only for aim of removing of the clouding energy is wastefully consumed at the portion of loops in the vibration.

In view of the above in the device according to this embodiment, the loops and the nodes of the vibrations generated in the mirror 12 are displaced by the special oscillation means 70 thereby preventing the occurrence of clouding in the mirror 12. Explanation is to be made for the oscillation means in this embodiment referring to FIG. 20.

A power source circuit 71 is connected to a battery 72 to supply electric power at a constant voltage to the oscillation means 70.

A start switch 73 is disposed at a position in a passenger's chamber easy to be operated. The oscillation means 70 is so adapted that it may vibrate the ultrasonic vibrator 20A for a predetermined period of time after the start switch 73 has been operated.

The time during which the ultrasonic vibrator 20A is driven is determined depending on a timer circuit 74. The time circuit 74 comprises an input buffer 75 and a one-shot multi-vibrator 76. The output from the one-shot multi-vibrator 76 turns from "L" to "H" simultaneously with the turning ON of the start switch 73 for about five seconds.

The output from the multi-vibrator 76 is inputted into a relay circuit 77. The relay circuit 77 comprises a relay driver 78 and a relay 79. The output from the multi-vibrator 76 is applied by way of a relay driver 78 to the relay 79. The contact 79a for the relay 79 is kept ON for about five hours during a period where the output from the one-shot multi-vibrator 76 is in "H", that is, for about 5 second after the start switch 73 has been turned ON. An electric power is supplied to a sweep generator 80 while the contact 79a is turned ON.

The sweep generator 80 is a circuit for the sweep generation within a range of a predetermined frequency. The sweep generator 80 comprises a trigonal wave generation circuit 81, a voltage-controlled oscillation circuit 82 and a vibrator driving circuit 83.

The trigonal wave generation circuit 81 changes the oscillated frequency from the voltage-controlled oscillation circuit 82 to sweep the predetermined range of frequency. The frequency range is defined as from about 40 KHz to about 75 KHz so that it includes the resonance frequency both in the shorter side and in the longer side directions of the ultrasonic vibrator 20A and, a lot of resonance frequencies for the mirror 12 may be contained. The characteristics of the trigonal wave generation circuit 81 is determined such that the voltage-controlled oscillation circuit 82 is swept for several times for about 5 sec within the frequency range.

The output signal from the voltage-controlled generation circuit 82 is increased by a vibrator driving circuit 83 and then drives the ultrasonic wave vibrator 20A.

When the oscillation frequency of the sweep oscillator 80 changes, since the wavelength of the vibrations generated on the mirror 12 changes, the loops and the nodes of the vibrations generated on the mirror 12 are moved. In addition, if the oscillation frequency of the sweep oscillator 80 is changed, since the vibrations generated on the mirror 12 are caused in the longer direction or the shorter direction of the ultrasonic vibrator 20A, the direction of the vibrations caused on the mirror 12 are changed.

As has been described above in the device according to this embodiment, since not only the wavelength of the vibrations generated on the mirror 12 is changed but also the direction of the vibrations is also changed, the loops and the nodes for the vibrations generated on the mirror 12 can be moved more surely to remove the water droplets deposited to the entire surface of the mirror 12 with no unevenness.

Further, in the device according to this embodiment, since the oscillation frequency of the sweep oscillator 80 is set to the outside of an audible frequency region, no noisy audible sounds are generated from the mirror 12.

Furthermore, since the oscillation frequency of the sweep oscillator 80 fluctuates within the range of the frequency containing a lot of resonance frequencies for the mirror 12, if the resonance frequency of the mirror 12 should fluctuate by some or other reasons, the mirror 12 can surely be put under resonance.

As has been described above, in the device for removing water droplets according to the present invention comprising a vibrator bonded to the rear face of a plate-like member secured vibratable and oscillation means for vibrating the vibrator at a specific frequency, the thickness T for the vibrator relative to the thickness t for the plate-like member is defined as: $0.25t \leq T \leq 2.5t$.

Accordingly, since the thickness or the like of the plate-like member such as mirror made of material that can be used for automobiles are restricted, it is possible to reduce the effect of the thickness of the vibrator by defining the thickness T for the vibrator as: $0.25t \leq T \leq 2.5t$, and enable uniform removal of the water droplet etc. on the surface of the plate-like member. Further, the power can surely be obtained even in a state where the vibrator is constrained.

Further, in a device for removing water droplets comprising a vibrator bonded to the rear face of a plate-like member secured vibratably and oscillation means for causing the vibrator to conduct bending vibrations due to the lateral effect by a specified frequency, if the diameter D of the vibrator relative to the lateral width L and the longitudinal width H for the plate-like member is defined as at least one of ranges: $D \leq L/3$ and $D \leq H/2$, the inner stress of the plate-like member is increased locally if the diameter of the vibrator is large when the bending vibrations due to the lateral effect of the vibrator when it changes radially are transmitted to the plate-like member. However, destruction of the plate-like member can be prevented by setting the diameter of the vibrator as at least one of ranges: $D \leq L/3$ and $D \leq H/2$ in a plate-like member such as a mirror made of material that can be used for automobiles. Then, in a device for removing water droplets comprising a vibrator bonded to rear face of a plate-like member secured vibratably and oscillation means causing the vibrator to conduct bending vibrations due to the lateral effect at a specific frequency, if the thickness T of the vibrator relative to the lateral width L, the longitudinal width H and the thickness t of the plate-like member as: $0.25t \leq T \leq 2.5t$ and the diameter D as at least one of ranges: $D \leq L/3$ and $D \leq H/2$, since the conditions for both of them can be satisfied simultaneously, it is possible to reduce the effect of the thickness of the vibrator and remove the water droplets, etc. uniformly from the surface of the plate-like member, as well as to attain sufficient power even in a state where the vibrator is constrained. Then, the destruction of the plate-like member can be prevented.

Further, for the plate-like member setting the lateral with : $L \approx 160$, the longitudinal with $H \approx 90$ and the thickness $t \approx 1.9$ if the diameter D of the vibrator is defined as : $20 \text{ mm} \leq D \leq 60 \text{ mm}$, it is possible to reduce the effect of the thickness of the vibrator and remove the water droplets, etc. uniformly from the surface of the plate-like member, as well as to attain sufficient power even in a state where the vibrator is constrained. Then, the destruction of the plate-like member can be prevented.

Further, by making the shape of the vibrator polygonal and providing oscillation means causing the vibrator to conduct bending vibrations due to the lateral effect at a predetermined frequency, since the size of the vibrator can be made smaller as compared with that of the plate-like member and vibrations are excited in different directions on the plate-like member, thereby displacing the loops of vibrations generated on the plate-like member, water droplets deposited on the plate-like member can be removed with no unevenness.

We claim:

1. A device for removing water droplets comprising a plate-like member, an ultrasonic vibrator bonded to the rear face of said plate-like member and oscillation means for vibrating said ultrasonic vibrator at a determined frequency, wherein
   the thickness of said ultrasonic vibrator is defined as within a range;

$$0.25 \leq T \leq 2.5t$$

where
   t represents the thickness of the plate-like member and T represents the thickness of the ultrasonic vibrator, and
   wherein said plate-like member is bent repeatedly by vibration of said ultrasonic vibrator in a direction parallel to a face of said plate-like member, thereby removing water droplets deposited on said plate-like member.

2. A device for removing water droplets comprising a plate-like member, an ultrasonic vibrator bonded to the rear face of said plate-like member and oscillation means for causing said ultrasonic vibrator to conduct bending vibration due to lateral effect at a predetermined frequency, wherein,
   the diameter of said ultrasonic vibrator is defined as within at least one of ranges:

$$D \leq L/3 \text{ and } D \leq H/2$$

where
   D represents the diameter of the ultrasonic vibrator,
   L represents the lateral width of the plate-like member and
   wherein said plate-like member is bent repeatedly due to lateral effect of said ultrasonic vibrator, thereby removing water droplets deposited on said plate-like member.

3. A device for removing water droplets according to claim 1, wherein
   the thickness of the ultrasonic vibrator is defined as within a range:

$$0.25t \leq T \leq 2.5t$$

and the diameter for the ultrasonic vibrator is defined as within at least one of ranges:

$$D \leq L/3 \text{ and } D \leq H/2$$

where t, T, D, L and H have same meanings as described above, and
   wherein said plate-like member is bent repeatedly by vibration of said ultrasonic vibrator in a direction parallel to a face of said plate-like member, thereby removing water droplets deposited on said plate-like member.

4. A device for removing water droplets according to claim 3, wherein
   for the lateral width L of the plate-like member approximately equal to 160 (mm), the longitudinal width H thereof approximately equal to 90 (mm) and the thickness thereof approximately equal to 1.9 (mm),
   the thickness of the ultrasonic vibrator is defined as within a range:

$$0.5 \text{ (mm)} \leq T \leq 5 \text{ (mm)}$$

and the diameter for the ultrasonic vibrator is defined as within a range:

$$20 \text{ (mm)} \leq D \leq 60 \text{ (mm)},$$

where T and D have the same meaning as described above, and
   wherein said plate-like member is bent repeatedly by vibration of said ultrasonic vibrator in a direction parallel to a face of said plate-like member, thereby removing water droplets deposited on said plate-like member.

5. A device for removing water droplets comprising a plate-like member, an ultrasonic vibrator of a polygonal shape bonded to the rear face of said plate-like member and oscillation means for causing said ultrasonic vibrator to conduct bending vibration due to lateral effect at a predetermined frequency, wherein
   said plate-like member is repeatedly bent due to lateral effect of said ultrasonic vibrator, thereby removing water droplets deposited to said plate-like member.

6. A device for removing water droplets according to claim 5, wherein the shape of the ultrasonic vibrator is rectangular.

7. A device for removing water droplets according to claim 1, wherein the oscillation means is oscillated at a resonance frequency of the plate-like member.

8. A device for removing water droplet according to claim 2, wherein the oscillation means is oscillated at a resonance frequency of the plate-like member.

9. A device for removing water droplet according to claim 5, wherein the oscillation means is oscillated at a resonance frequency of the plate-like member.

10. A device for removing water droplet according to claim 1, wherein the oscillation means is oscillated at a frequency out of the range of the audible frequency.

11. A device for removing water droplet according to claim 2, wherein the oscillation means is oscillated at a frequency out of the range of the audible frequency.

12. A device for removing water droplet according to claim 5, wherein the oscillation means is oscillated at a frequency out of the range of the audible frequency.

* * * * *